US007185107B1

(12) United States Patent
Cassar

(10) Patent No.: US 7,185,107 B1
(45) Date of Patent: Feb. 27, 2007

(54) REDIRECTING NETWORK TRAFFIC THROUGH A MULTIPOINT TUNNEL OVERLAY NETWORK USING DISTINCT NETWORK ADDRESS SPACES FOR THE OVERLAY AND TRANSPORT NETWORKS

(75) Inventor: Christian Cassar, Uxbridge (GB)

(73) Assignee: Cisco Technology Inc., San Jose, CA (US)

( * ) Notice: Subject to any disclaimer, the term of this patent is extended or adjusted under 35 U.S.C. 154(b) by 769 days.

(21) Appl. No.: 10/270,409

(22) Filed: Oct. 2, 2002

(51) Int. Cl.
*G06F 15/16* (2006.01)

(52) U.S. Cl. ............. 709/239; 709/238; 709/232; 709/240; 709/245; 709/246; 370/389; 370/346

(58) Field of Classification Search ........... 709/238, 709/245, 240, 246, 232, 239; 370/389, 346
See application file for complete search history.

(56) References Cited

U.S. PATENT DOCUMENTS

| 2002/0080819 A1* | 6/2002 | Tsao ................. 370/469 |
| 2002/0133618 A1* | 9/2002 | Desai et al. ........... 709/238 |
| 2003/0108041 A1* | 6/2003 | Aysan et al. .......... 370/389 |
| 2003/0158962 A1* | 8/2003 | Keane et al. .......... 709/238 |
| 2006/0007929 A1* | 1/2006 | Desai et al. .......... 370/389 |

OTHER PUBLICATIONS

E. Rosen et al., "BGP/MPLS VPNs," Mar. 1999, pp. 1-25.
Yakov Rekhter et al., "Use of PE-PE GRE or IP in RFC2547 VPNs," Expiration Date: Aug. 2002, pp. 1-6.

* cited by examiner

*Primary Examiner*—William Vaughn
*Assistant Examiner*—Barbara Burgess
(74) *Attorney, Agent, or Firm*—Hickman Palermo Truong & Becker LLP

(57) ABSTRACT

A method and apparatus for redirecting network traffic through a multipoint tunnel overlay network using distinct network address spaces for the overlay and transport networks. In an IP implementation, redirecting traffic to be tunneled across a network comprises deriving the transport IP address of a multipoint tunnel endpoint from the network IP address by making the transport address numerically equivalent to the network address, the transport address being in an address space distinct from the address space of the network address. Traffic is redirected by changing the address space of the next hop in a received routing advertisement.

28 Claims, 5 Drawing Sheets

REDIRECTING NETWORK TRAFFIC THROUGH A MULTIPOINT TUNNEL OVERLAY NETWORK USING DISTINCT NETWORK ADDRESS SPACES FOR THE OVERLAY AND TRANSPORT NETWORKS

FIELD OF THE INVENTION

This invention generally relates to the field of internetworking in data communications. The invention relates more specifically to redirecting network traffic through a multipoint tunnel overlay network using distinct IP address spaces for the overlay and transport networks.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An internet comprises a plurality of sites attached to a common network known as a backbone. Traffic between sites is routed from the source to a destination via nodes of the network. The traffic may be switched at the nodes based on the destination address. Alternatively, the traffic may be switched based on a header that is pre-pended to the original traffic such that some intermediate routing nodes have no knowledge of the final destination address. This latter approach is known as tunneling and one well-known use of this approach is in the provision of virtual private networks (VPNs). This application of tunneling will be used to exemplify the invention but the invention is not intended to be limited to this area of application.

The Internet Engineering Task Force (IETF) was set up to establish internet protocols. The IETF RFC2547 (March 1999) deals with the provision of VPN services by a service provider. At each site, there are one or more Customer Edge (CE) devices, each of which is attached via a data link (e.g. Ethernet, PPP, ATM, GRE tunnel etc.) to one or more Provider Edge (PE) routers. The service provider's network comprises the PE routers and as well as other routers (P routers) that are not attached to CE devices. When a service provider deploys an RFC2547-based VPN service, VPN traffic is transported across the core network between Provider-Edge routers (PE). This may be done by the use of IP "tunnels" which can be used to transport traffic across a service provider network. This idea was proposed by Eric Rosen and Yakov Rekhter in their IETF proposal entitled "Use of PE-PE GRE or IP in RFC2547 VPNs" (available from the IETF website and found at http://www.ietf.org/internet-drafts/draft-ietf-ppvpn-gre-ip-2547-01.txt).

According to RFC2547, each PE router maintains a number of forwarding tables. Each site to which the PE is attached is mapped to one of the forwarding tables. On receipt of a packet from a site, the forwarding table for that site is consulted to determine the route for the packet. Once a PE learns of a site that is reachable from a new site, this information is distributed to all the other PE routers to which the PE router is attached, for instance by using a protocol such as BGP (Border Gateway Protocol). The PE routers update their forwarding tables in response.

PE routers exchange VPNv4 routes using BGP. A PE router receives enough information in a VPNv4 update so as to determine that traffic received at a router, destined to some prefix P/m, should be tunneled to a destination N'. A PE router receiving this information must set up its forwarding path to do just this. IP based tunneling from one PE to another may be used as proposed in the Rosen/Rekhter draft referred to above. A logical IP tunnel network makes the endpoints of the tunnel, i.e. the PE routers, immediately adjacent at the internetwork layer—layer 3. Thus, an overlay network is used to represent the direct path taken by tunneled traffic. This overlay network is accessed by a PE router through a logical tunnel interface.

If traffic to P/m needs to be tunneled to some destination N' (N' being in the transport network), then the route to P/m is via N where N is an address on the tunnel overlay network and such that N is the tunnel address of a PE router reachable at N' on the transport network.

In other words, for traffic to P/m to be tunneled to N', an IP route of the form "P/m via N reachable through tunnel interface" is set up. The use of a tunnel interface and a tunnel overlay network allow routes in a routing table to prescribe how traffic should be routed without introducing exceptions for tunneled as opposed to forwarded traffic. The tunnel interface identifies that tunnel encapsulation must be imposed and N identifies which tunnel endpoint should be used.

When a routing update for the prefix P/m is received, the PE router needs to install the prefix P/m in the appropriate routing and forwarding table. A route lookup in this table for a destination covered by this prefix P/m should return the appropriate next hop/interface to which to dispatch the packet. To enable traffic to be transported over the tunnel overlay (i.e. tunneled through the transport network) to the remote PE, the route lookup must return a next hop on the overlay tunnel network. Consider the prefix 100.4.4.0/24 advertised by PE2 to PE1 with a next hop N, as shown in FIG. 1 and targeted to be installed in a table called "customer". Assuming the correct route-targets are associated with the VPNv4 prefix in the BGP update, 100.4.4.0/24 would be installed in the routing and forwarding tables "customer" on PE1 as shown below:

ccassar-72a#sh ip route vrf customer
B 100.4.4.0/24 [200/0] via N, 00:01:47

The prefix 100.4.4.0/24 with next hop N must resolve through the connected tunnel network in order to ensure that traffic to 100.4.4.0/24 is tunneled through the transport network. Linking 100.4.4.0/24 to a next hop N on the tunnel interface completes the forwarding setup for traffic sent to 100.4.4.0/24. However, in the prior art, the IP address N on the tunnel would then have to be resolved to an underlying IP address of the router (123.1.1.4 in the example shown in FIG. 1) so that the outer IP header imposed when tunneling through the transport network can be populated appropriately and traffic can be tunneled to the destination through the transport network. This process is analogous to resolving an IP next hop address to a MAC address using ARP on an Ethernet interface.

The disadvantages of this solution include: the need to use an address resolution protocol to provide the mapping between the IP address of the tunnel endpoint in the overlay network and the underlying transport address; and the allocation of address space by a service provider for the tunnel network such that all tunnel endpoints are provided with unique addresses, which are distinct from those of the transport network. Address allocation and address resolution become more challenging if multiple service providers coordinate to provide the tunnel overlay network. In such a case, the overlay network is shared amongst all service providers and every router on the end of a tunnel is adjacent to every other one. Coordinating addressing and address resolution on the overlay network in such a case is more complicated if all addresses need to be unique amongst the set of addresses on the overlay AND the transport network.

SUMMARY OF THE INVENTION

In accordance with the invention there is provided a method for directing traffic across a network. On receipt of traffic for a destination address in a network, there is looked up in a first address space information as to how traffic for the destination is to be forwarded, the information including a specified node N. There is then looked up in the second address space an address of the specified node N, the address of the node N in the second address space being related to an address in the first address space. For traffic that is to be tunneled to a specified node, the traffic is encapsulated in a header including the address specified in the first address space that is related to the address in the second address space.

The address in the second address space is preferably numerically identical to the related address in the first address space. The related address in the first address space may be a link layer IP address corresponding to the internetwork layer IP address of a tunnel endpoint in the second address space. A multipoint tunnel network may be defined in the second address space.

A routing protocol update may be used to distribute routing information between nodes of the network. This may take the form of an advertised next hop in a routing protocol update, the receipt of which triggers the creation of a tunnel endpoint with an IP address in the second address space corresponding to the IP address in the first address space. Preferably the IP address in the second address space is an internetwork layer IP address and the IP address in the first address space is a link layer IP address A plurality of second address spaces may be provided, corresponding to the definition of multiple tunnels.

In a second aspect of the invention there is provided a router for directing traffic on a network, the router comprising a first address space including information relating to a destination address and information relating to forwarding of traffic for the destination address and a second address space including information relating to tunnel endpoint addresses. A tunnel endpoint address in the second address space is related to the forwarding information in the first address space.

All addresses in the second address space may be directly connected to a multi-point tunnel network. The addresses in the second address space thus define a multi-point tunnel network.

The tunnel endpoint address in the second address space is preferably numerically identical to the address in the first address space. The address in the first address space may be a link layer IP address and the tunnel endpoint address in the second address space may be an internetwork layer IP address.

A routing protocol update may be used to distribute routing information between nodes of the network. The receipt of an advertised next hop in a routing protocol update triggers the creation of a tunnel endpoint with an IP address in the second address space corresponding to the IP address in the first address space.

A plurality of second address spaces may be provided, corresponding to the definition of multiple tunnels.

A router for directing traffic via a network, the network including a plurality of interconnected nodes, comprises a first address space for storing information received from nodes of the network. The information indicates a destination address and information as to how traffic for the destination address is to be forwarded via a specified node of the network. A second address space stores information relating to how traffic is to be tunneled to a node of the network, the information indicating a destination address. The destination address in the second address space is related to an address of the specified node in the first address space. On receipt of routing information for the destination, the router re-directs the traffic for the destination by changing the address space of the next node from the first address space to the second address space.

A method of creating a virtual private network via one or more networks owned by one or more internet service providers, comprises receiving information at a first node of the network that traffic for a destination is to the tunneled via a second node of the network. The information indicates that the traffic for the destination is to be tunneled to the node. The destination is part of a virtual private network. On receipt of routing information for the destination in the virtual private network, the traffic for the destination is re-directed by changing the address space of the next node from a first address space to a second address space. The information may be in a routing update received via the network.

A method of redirecting traffic to be tunneled across a network comprises deriving a link layer IP address of a multipoint tunnel endpoint from an internetwork layer IP address by making the link layer address numerically equivalent to the internetwork layer address, the link layer address being in a first address space distinct from a second address space of the internetwork address. Traffic is redirected by changing the address space of the next node from the first address space to the second address space.

The present invention can be used in conjunction with other mechanisms to provide a service provider with a transport mechanism based on IP tunnels for the delivery of virtual private networks.

BRIEF DESCRIPTION OF THE DRAWINGS

The invention will now be described further, by way of example only, with reference to the accompanying drawings, in which.

DETAILED DESCRIPTION

A method and apparatus for redirecting network traffic through a multipoint tunnel overlay network using distinct network address spaces for the overlay and transport networks is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram to avoid unnecessarily obscuring the present invention.

To aid a reader of this specification, a summary of acronyms used herein is given below:

AS Autonomous System

BGP Border Gateway Protocol

CE Customer Edge Router

CEF Cisco Express Forwarding

GRE Generic Route Encapsulation

LSP Label Switched Path

MPLS Multi Protocol Label Switching

MSS Maximum Segment Size

MTU Maximum Transmission Unit

P Provider routers which do not connect to customer routers

PE Provider Edge Router

RiV Resolve-in VRF

VRF Virtual Routing and Forwarding table

Figure 2:
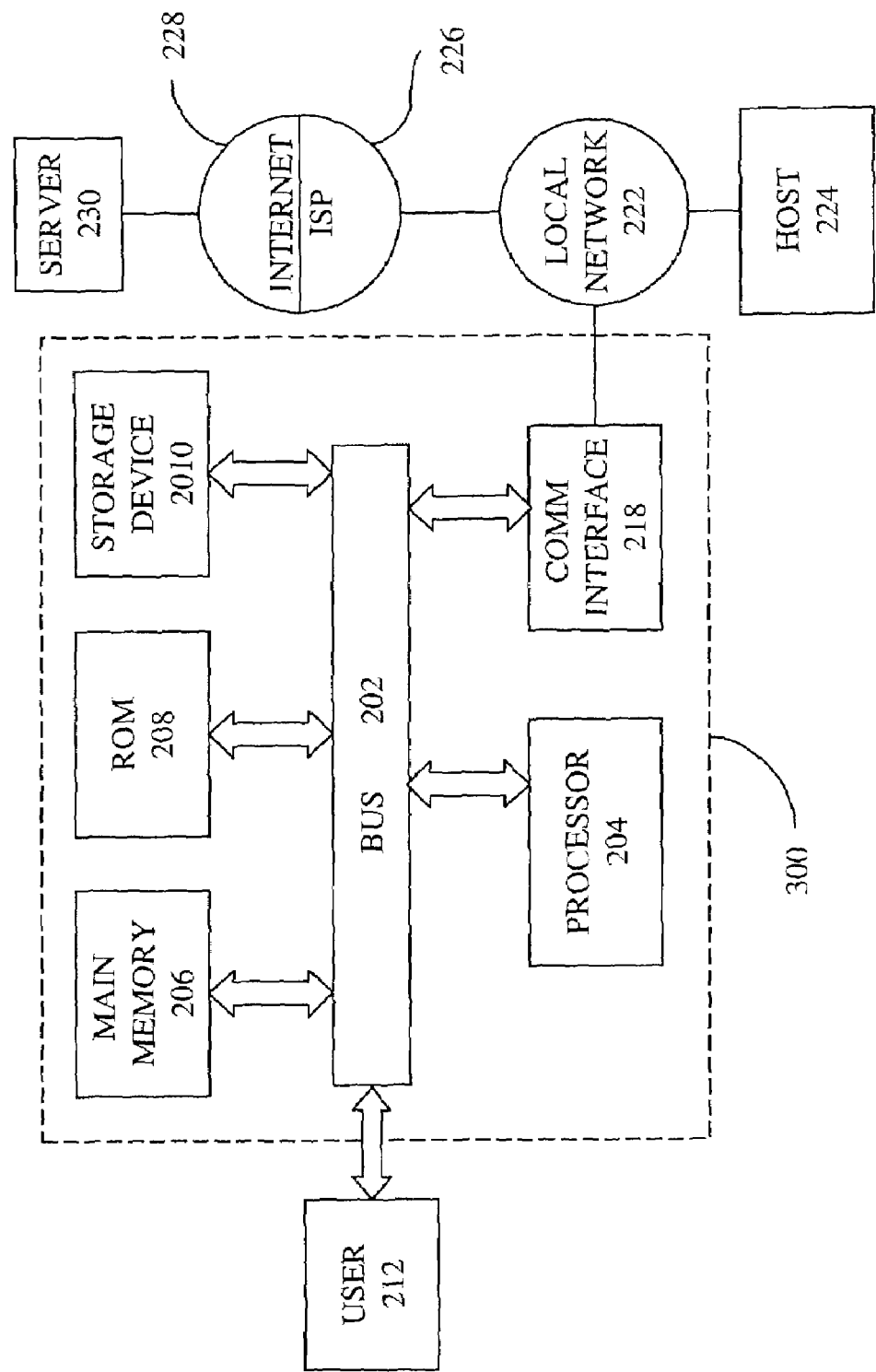
FIG. 2 is a block diagram that illustrates a computer system upon which an embodiment of the invention may be implemented.

FIG. 2 is a block diagram that illustrates a computer system 200 upon which an embodiment of the invention may be implemented. The preferred embodiment is implemented using one or more computer programs running on a network element such as a router device. Thus, in this embodiment, the computer system 200 is a router.

Computer system 200 includes a bus 202 or other communication mechanism for communicating information, and a processor 204 coupled with bus 202 for processing information. Computer system 200 also includes a main memory 206, such as a random access memory (RAM), flash memory, or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, flash memory or optical disk, is provided and coupled to bus 202 for storing information and instructions.

A communication interface 218 may be coupled to bus 202 for communicating information and command selections to processor 204. Interface 218 is a conventional serial interface such as an RS-232 or RS-422 interface. An external terminal 212 or other computer system connects to the computer system 200 and provides commands to it using the interface 214. Firmware or software running in the computer system 200 provides a terminal interface or character-based command interface so that external commands can be given to the computer system.

A switching system 216 is coupled to bus 202 and has an input interface 214 and an output interface 219 to one or more external network elements. The external network elements may include a local network 222 coupled to one or more hosts 224, or a global network such as Internet 228 having one or more servers 230. The switching system 216 switches information traffic arriving on input interface 214 to output interface 219 according to pre-determined protocols and conventions that are well known. For example, switching system 216, in cooperation with processor 204, can determine a destination of a packet of data arriving on input interface 214 and send it to the correct destination using output interface 219. The destinations may include host 224, server 230, other end stations, or other routing and switching devices in local network 222 or Internet 228.

The invention is related to the use of computer system 200 for redirecting traffic, especially tunneling traffic. According to one embodiment of the invention, this is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, storage non-volatile media and volatile media, and transmission media. Non-volatile media includes, for example, optical or magnetic disks, such as storage, device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Communication interface 218 also provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for tunneling as described herein.

The received code may be executed by processor 204 as it is received, and/or stored in storage device 210, or other non-volatile storage for later execution. In this manner, computer system 200 may obtain application code in the form of a carrier wave.

The invention will be described with reference to the provision of Virtual Private Networks. However the invention is applicable to any internetworking system in which traffic is to be tunneled. Multiple service providers may cooperate and offer a joint VPN service with traffic tunneled directly from the ingress PE router at one service provider directly to the egress PE router at a different service provider. These service providers can be interconnected through non-cooperating service providers since IP packets are providing inter-PE transport for the VPN payload traffic.

The invention includes the use of a separate address space for the overlay network rendering address resolution trivial. An overlay multi-access tunnel network is used to interconnect the PE routers (implying that only a single tunnel needs to be configured on a PE in order for the PE to be able to transport VPN traffic to all PEs). A protocol, such as Border Gateway Protocol (BGP), is used to distribute routing information, such as VPNv4 routing information, between PE routers. The advertised next hop in BGP VPNv4 updates may be used to trigger tunnel endpoint discovery. A peer routing relationship is maintained between the service provider network and customer sites. The invention also allows for the ability to provide flexible IP output features as traffic enters the overlay network using multiple address spaces for the tunnel overlay network.

The invention may be used by a service provider with an existing IP network to add, for example, a RFC2547 VPN service to the portfolio of services offered and not wishing to migrate the core of the network from IP forwarding to MPLS switching. It is this application that will now be considered as an exemplary embodiment of the invention.

Deploying the invention in support of RFC2547 VPN over IP results in a simple configuration, which is not on a per-VRF or per-remote PE basis. A PE is able to use both IP tunnel and LSPs for transport of VPN traffic and this may be selectable on a per prefix basis.

Figure 4:
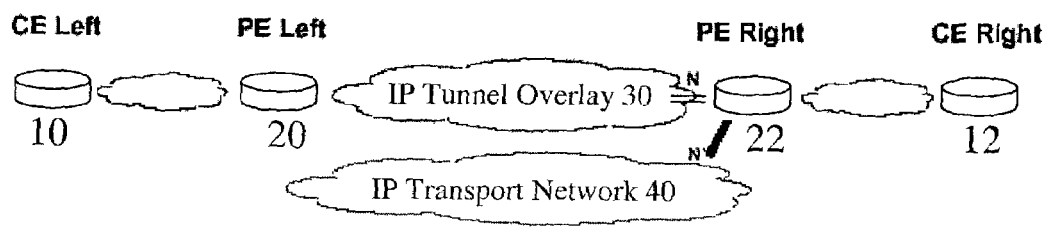
FIG. 4 shows an example of a RFC2547-based VPN using a tunnel overlay network.

The peer relationship between customer sites and the service provider network is retained (contrary to what might be assumed because of the introduction of the overlaid IP tunnel network). The PE routers are interconnected through a multi-access overlay network but the routing relationship from the CE remains with the PE and is not with the remote CE. FIG. 4 shows an example of RFC2547-based VPN using a tunnel overlay network. In FIG. 4, CE Left 10 exchanges routes with PE Left 20. PE Left 20 exchanges routes with the rest of the PEs e.g. PE 22. A single routing entity is used to distribute routing information in all VPNs. The routes exchanged between PE routers use a next hop address from the tunnel overlay network. PE Right 22 receives routes from PE Left 20 (e.g. via a route reflector) with a next hop address signifying a PE Left interface address connecting PE Left to the tunnel overlay network. PE Right propagates this information to CE Right 12. Routers at different sites still do not exchange routes directly but only through the mutual routing peer i.e. the service provider network.

The function of the overlay multi-access tunnel network 30 is to provide full connectivity between PE routers so as to be able to transport all IP VPN traffic through the core. The underlying transport network 40 is totally ignorant of the L3 VPN routing information. The only routing information required in the transport network 40 is that required to provide full connectivity between PE routers or tunnel endpoints. No extra state needs to be maintained in these core routers in order to facilitate the transport of VPN traffic across the core. By redirecting traffic through the overlay network at a PE, the traffic is tunneled through the core transport network as opposed to switched. The invention proposes that this redirection is achieved by changing the address space of the next hop as opposed to changing the numerical value of the next hop.

Routing updates such as BGP VPNv4 updates can be interpreted by the receiving PE router as an instruction that a VPN prefix is reachable by tunneling to some destination as opposed to switching to the destination. Consider now FIG. 5 and the example of a VPN prefix 100.4.4.0/24 advertised using BGP with a next hop of 123.1.1.4. This BGP VPNv4 update is interpreted as an instruction that a VPN prefix 100.4.4.0/24 is reachable by tunneling to 123.1.1.4.

This instruction is translated into a set of routing and forwarding entries such that (i) traffic received from the appropriate VRF and destined to an IP address within 100.4.4.0/24 will be tunneled to 123.1.1.4 and (ii) the routing and forwarding infrastructure set up by this instruction will not require any special handling of route updates in the control plane or of traffic in the forwarding plane.

If a BGP update is interpreted as an instruction to tunnel traffic to the BGP next hop, the VPN route cannot be installed as:

100.4.4.0/24 via 123.1.1.4

This is because the above indicates that traffic to 100.4.4.0/24 should be forwarded to 123.1.1.4.

Tunneling traffic from point A to point B implies that point A and point B become adjacent at the internetwork layer for the purposes of IP traffic tunneled from A to B. This fact can be modeled adequately by connecting A and B directly using a logical link and providing each router with a virtual interface onto this logical link.

This virtual interface takes the form of the tunnel interface. Directing traffic for a prefix such as 100.4.4.0/24 out of a tunnel interface implies that traffic to 100.4.4.0/24 would be tunneled. Thus, the prefix 100.4.4.0/24 will be installed so as to send traffic via a tunnel interface (either directly or as a recursive route which resolves to a prefix through a tunnel interface). The BGP next hop is used as the tunnel endpoint address.

A PE router will receive VPNv4 BGP updates originating from a number of PE routers. All these will be interpreted to indicate that traffic should be tunneled to the PE router and not forwarded to the PE router so as to make sure that the payload traffic gets through the transport network without being inspected. A PE router is expected to be able to tunnel traffic to all the other PE routers. This means that the PE-PE adjacency can be modeled through either a full mesh of point-to-point tunnels or a single multi-access network with each PE having access to this network through a single virtual interface referred to as a multipoint tunnel interface. The second option is the more attractive option from a practical standpoint since it does not require multiple interfaces to be maintained.

A multipoint tunnel interface can be used to tunnel to multiple endpoints. Thus if a prefix is routed through the tunnel interface to this next hop, then the route would point out of a tunnel/next hop as follows;

100.4.4.0/24 . . . via N

N via Tunnel1, N ( . . . indicates that this would be through recursion since a BGP hop installs recursive routes)

Note that the purpose of N is to allow the identification of one of many tunnel endpoints to which traffic should be sent. At this point, N is known to identify the tunnel endpoint reached through 123.1.1.4. But 123.1.1.4 is not the next hop address; 123.1.1.4 is the address to tunnel to. Using Ethernet as an example, N would be the equivalent of the IP address whereas 123.1.1.4 would be the equivalent to the MAC address corresponding to the IP address N.

One possible solution would be to provide some tunnel address resolution mechanism and allow BGP to advertise prefixes with N as next hop. The address resolution mechanism would then resolve N to 123.1.1.4 so that the forwarding tunnel adjacency could be prepared with the appropriate tunnel endpoint destination. This will allow existing routing and forwarding entries in the routing and forwarding table to translate the instruction "traffic to 100.4.4.0/24 should be tunneled to 123.1.1.4" into action except that it would be done in two stages i.e. "traffic to 100.4.4.0/24 should be forwarded to N on Tunnel 1, and N resolves to 123.1.1.4".

The approach herein however renders the address resolution mechanism trivial. By moving N into an address space "RiV" that is distinct from that of the transport network, address resolution becomes trivial. This is because the next hop on the tunnel can be configured with a numerically equivalent IP address on the tunnel network. Thus receiving a BGP update with a next hop of 123.1.1.4 means that traffic should be forwarded to a PE router with address 123.1.1.4 which is directly connected to the tunnel network. That tunnel address resolves to a transport network address of 123.1.1.4 in the address space of the transport network. The VPN route would then resolve to:

100.4.4.0/24 . . . forwarded to Tunnel 1, 123.1.1.4 where the adjacency to Tunnel 1, 123.1.1.4 in "RiV" causes traffic to be tunneled to 123.1.1.4 in the IP transport network.

Tunnel overlay address-to-transport network address resolution is trivial because the IP addresses are numerically both 123.1.1.4. This is only possible because the address spaces of the tunnel overlay "RiV" and the transport network are distinct. The main benefit of the "RiV" is that it allows the tunnel address and tunnel endpoint to have the same 32-bit value for an IP address. This is illustrated in FIG. 5.

This invention is built around the ability of a routing update to be interpreted as indicating that the prefix advertised via a next hop N in the transport network, is reachable through a next hop N which is directly connected to the tunnel network in "RiV". The internetwork address of the next hop N on the tunnel network resolves to link layer IP address N in the global routing table.

Figure 5:
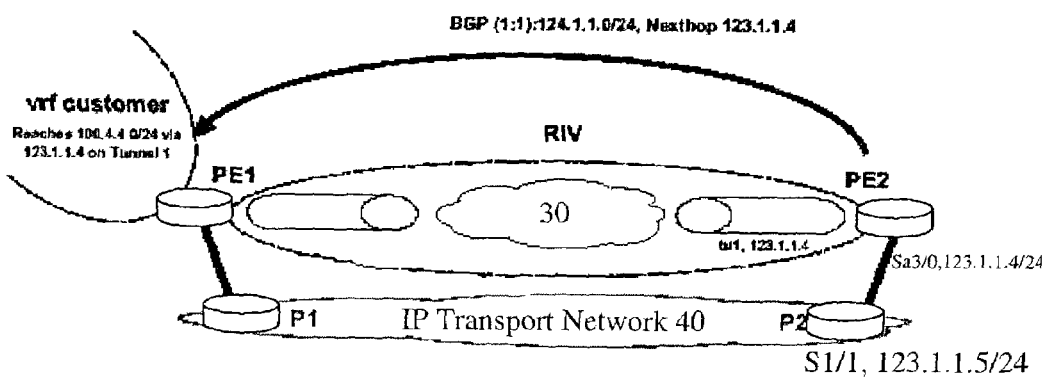
FIG. 5 shows how a tunnel address is resolved to its endpoint in accordance with the invention.

While deriving the model shown in FIG. 5 might seem a lengthy and maybe unnecessary exercise, the model attempts to avoid the need for any exception processing (e.g. next hop means "tunnel to" instead of "forward to" in some circumstances and not others).

In summary, a tunnel overlay network in a distinct address space allows the PE router to use routing and forwarding entries exactly as they exist today to provide routing through an overlay network interconnecting PE routers without incurring the cost of having to provide a complex address resolution mechanism to resolve overlay-to-transport network addresses.

According to the invention the IP Tunnel overlay is placed in an address space distinct from the transport network (using a VRF dedicated for this purpose and referred to as the Resolve-In VRF "RiV"). This results in number of significant advantages.

Since the IP address space of the tunnel overlay network 30 and the transport network 40 are distinct, the act of mapping from the overlay to the transport address can be reduced to a trivial operation. The overlay address is made numerically equivalent to the transport address, thus making address resolution trivial. With reference to FIG. 5, the IP address 123.1.1.4 is used as the destination IP address in the outer IP header transporting the VPN traffic across the service provider network. By providing a distinct address space, N could be assigned 123.1.1.4 in "RiV". N signifies the tunnel address on PE2, and this is numerically equivalent to the tunnel endpoint destination in the transport network 123.1.1.4. It would not be correct to say that they are the same IP addresses. They are two distinct addresses by virtue of being in different address spaces. They are however numerically equivalent.

Another advantage of placing the tunnel overlay network in a RiV is that an operator introducing a new VPN service does not have to obtain new addresses to number the tunnel interface on each PE. Instead, an existing IP address is used and the tunnel interface is placed in the RiV. A service provider deploying a VPN service in conjunction with a number of service providers would also find this beneficial since no extra effort is required to coordinate addressing on the tunnel overlay.

Placing the tunnel interface in a pre-configured VRF allows the operator to shift VPN traffic across the service provider network through different tunnel interfaces with different output features applied based on attributes of the advertised prefix other than the next hop. For each such output feature set, a RiV and a corresponding tunnel would be created.

Because the RiV for a prefix is selected when the VPNv4 update is received, an operator could decide that traffic going to prefixes advertised with community A should be resolved in RiV A and are consequently transported through tunnel 1 with output feature set 1. Prefixes with community B also behind PE2 should be resolved in RiV B and consequently transported through tunnel 2 with output feature set 2. Tunnel 1 and 2 could then be configured with different output property sets 1 and 2 respectively. Note that this facility is optional and a simple deployment would only require a single tunnel and a single RiV per PE router.

VPNv4 prefixes learnt from remote PE routers and which should be transported via a tunnel are identified and set to resolve via the RiV. This means that the next hop N would be looked up in the RiV in order to identify the immediate next hop where traffic should be forwarded. This may be implemented through a route-map by extending the "set ip next-hop" command to "set ip next-hop in-vrf<RiV>". This route-map can be selectively applied to prefixes and peers such that only traffic to specific prefixes would be tunneled. Any prefixes not selected would be switched across the service provider network. This facility allows tunneling to be used in conjunction with switching.

A default route out of the tunnel interface might need to be configured if summarizing the advertised next hops of all PE routers is not possible. After the VPNv4 prefix is installed in the customer VRF, CEF (Cisco Express Forwarding) may be used to resolve the prefix in RiV.

A special property of the RiV is that when a route is received which is configured to be resolved in the RiV, and such a route is resolved, this action is taken to be a tunnel endpoint discovery event and triggers the creation of a tunnel endpoint (if this endpoint has not already been created). In other words, when a prefix is installed in a customer VRF and resolves through a RiV out of a multi-point tunnel, the next hop used signifies a new tunnel endpoint. When a tunnel endpoint is discovered a number of things happen. The tunnel endpoint database for the tunnel is updated with the new endpoint information. The forwarding infrastructure for this endpoint is also prepared. In CEF, this involves the creation of an adjacency out of the tunnel interface. A tunnel adjacency contains a partially precomputed encapsulation string, which is pre-pended to any packet being switched through the adjacency. In one implementation when the tunnel used is a GRE tunnel, this is made up of an IP header followed by a GRE header. The IP header contains the destination in the transport network that would lead to the correct tunnel endpoint. In the example below, this destination is 7B010103. Below is an example of the partially pre-computed MAC string and the significance of the fields;

```
mac_string -
4500000000000000FF2FC3C87B0101017B010103000008847
========== IP Header ==========
45000000 00000000 FF2FC3C8 7B010101 7B010103
Version & Header Length
FF      Time To Live
2F      Protocol indicating GRE header to follow
C3C8    Checksum
. . . followed by source and destination 7B010101 7B010103
========== GRE Header ==========
00008847
Indicate MPLS payload follows
```

Once this stage is completed and the tunnel endpoint forwarding has been setup, VPN traffic can be switched through the tunnel overlay to the remote PE routers and on to the destination.

Figure 1:
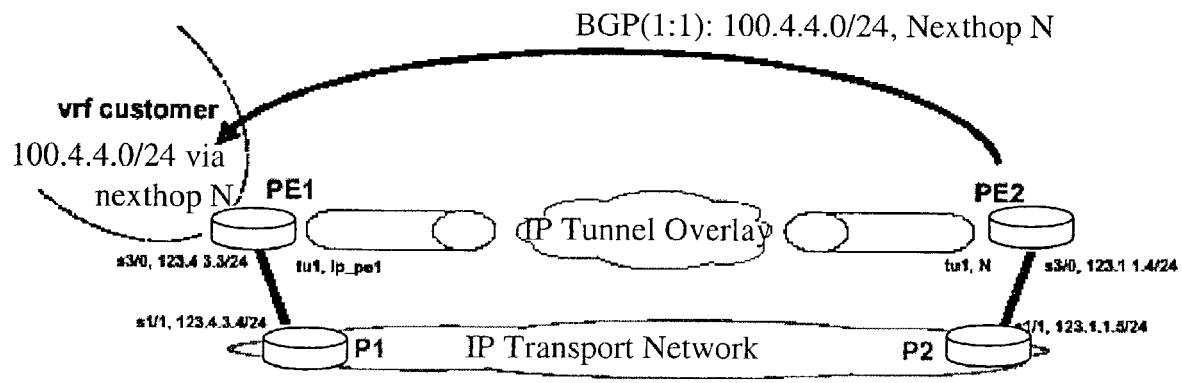
FIG. 1 shows an example of a tunnel overlay network.
Figure 3:
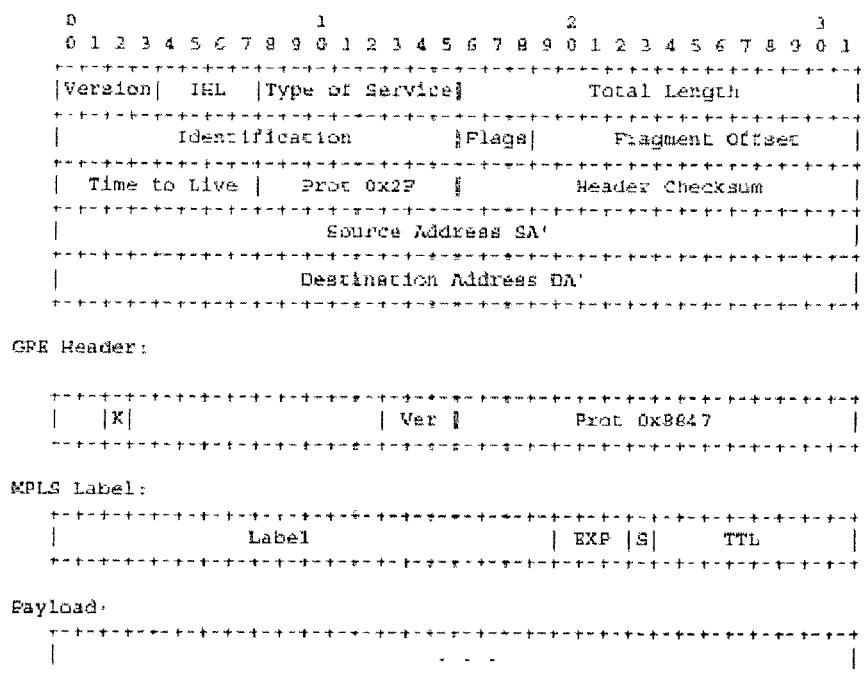
FIG. 3 shows an example of encapsulation using MPLS Label.

CEF switching onto a tunnel can be implemented using a technique known as double or recursive switching. When a packet is received from a CE router, and the IP lookup in the VRF returns the tunnel adjacency, the packet is encapsulated in an IP and a GRE header retrieved from the adjacency as a string, for instance as shown in FIG. 3. The IP header contains the destination IP address from the transport network that is numerically equivalent to the IP address of the next hop on the tunnel network. This is computed when the tunnel endpoint was discovered i.e. when BGP installed the prefix in the VRF and resolved the next hop in the RiV. Once the string has been pre-pended and the IP header total length and header checksum fields computed, the packet is then reinserted at the top of the ip switching path and is switched based on the contents of the transport address space towards the remote PE. At this point, the packet looks like one that originated on the PE and is destined to the remote PE and will be switched through the core as a normal IP packet.

When the remote PE receives the packet, the packet is inspected and identified as a tunneled packet. The receiving tunnel interface is a tunnel interface. The tunnel and VPN header on the packet indicate the table to be used to perform the IP look up on the payload IP packet. The PE router then strips of the tunnel header information (and any related header information) to reveal the original IP payload packet and then deals with the IP packet in the normal manner.

Figure 6:
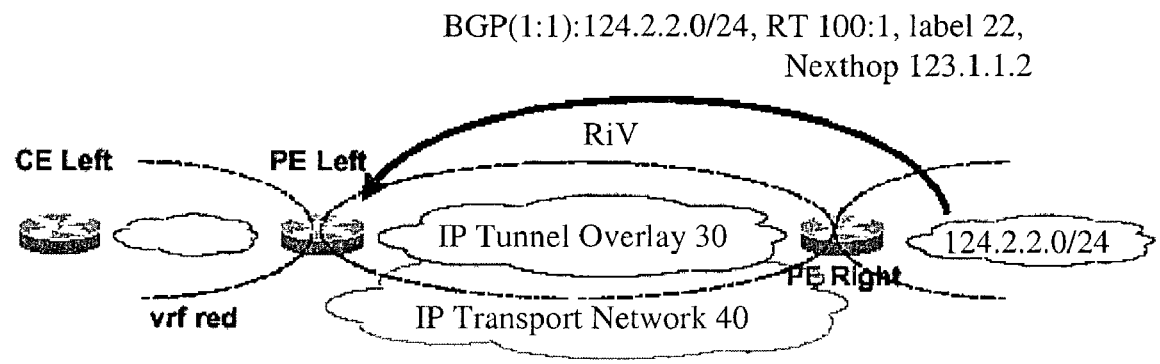
FIG. 6 shows an example of the invention implemented using multipoint GRE tunnel/VPN.

In order to clarify the description above, it is best to illustrate with an example using output collected from a prototype implementation. Consider FIG. 6. PE Right 22 is connected to a customer site and learns prefix 124.2.2.0/24 from the site. The VRF on the interface connected to the customer site is configured with an export route-target of 100:1 and a route distinguisher of 1:1. PE Right 22 advertises the VPNv4 update with a next hop of 123.1.1.2 (the transport address of PE Right). PE Left 20 will interpret this as a next hop on the tunnel overlay network in the RiV. PE Left will also assume that 123.1.1.2 on the tunnel overlay in the RiV can be reached by tunneling to destination 123.1.1.2 in the IP transport network 40. This is because the IP address of the tunnel interface of PE Right is numerically equivalent to the tunnel endpoint address on the IP transport network. If PE Left 20 needs to tunnel VPN traffic to PE Right 22, the destination address in the outer IP header should be 123.1.1.2.

In Cisco Internet Operating Software (IOS), a prefix would be selected for tunnel transport on PE Left by applying the "set ip next-hop in-vrf<my_RiV>" (where my_RiV would be a preconfigured RiV VRF) when the BGP update with the prefix is received from PE Right.

Route-map applied to neighbor:
neighbor 123.1.1.2 route-map ROUTE_MAP_FOR_IPVPN_ROUTES in
Route-map defined:
route-map ROUTE_MAP_FOR_IPVPN_ROUTES permit 10
set ip next-hop in-vrf<my_RiV>

Note that the route map in this example matches all prefixes since no match statement is configured. This implies that all VPNv4 BGP updates will be resolved in my_RiV and use the tunnel as transport through the service provider network. The filter could be more stringent and could operate by matching prefixes, communities etc so as to apply only to specific BGP updates. Alternatively, a default VRF may be defined which refers to the same address space. This results in a BGP entry as follows;
ccassar-72a#sh ip bgp vpnv4 vrf red 124.2.2.0
BGP routing table entry for 1:1:124.2.2.0/24, version 9

Paths: (1 available, best #1)
Not advertised to any peer
Local
123.1.1.2 in "my_RiV" from 123.1.1.2 (123.1.1.2)
Origin incomplete, metric 0, localpref 100, valid, internal, best
Extended Community: RT: 100:1

And a VRF entry;
ccassar-72a#sh ip route vrf red 124.2.2.0
Routing entry for 124.2.2.0/24
Known via "bgp 100", distance 200, metric 0, type internal
Last update from 123.1.1.2 00:40:11 ago
Routing Descriptor Blocks:
123.1.1.2 (my_RiV), from 123.1.1.2, 00:40:11 ago
Route metric is 0, traffic share count is 1
AS Hops 0

And a CEF entry;
ccassar-72a#sh ip cef vrf red 124.2.2.0
124.2.2.0/24, version 18, epoch 0
0 packets, 0 bytes
tag information set
local tag: VPN-route-head
via 123.1.1.2, 0 dependencies, recursive
next hop 123.1.1.2, Tunnel1 via 123.1.1.2/32 (my_RiV)
valid adjacency
tag rewrite with Tu1, 123.1.1.2, tags imposed: {22}
123.1.1.2 is resolved by looking up the next hop in the special VRF "my_RiV". This resolves to a next hop on the tunnel since all next hops are configured to be reachable on the tunnel network. E.g. using a default route out of the tunnel interface.

The action of resolving a prefix via the tunnel interface triggers tunnel endpoint discovery/creation which creates the tunnel endpoint and associated prefixes through the tunnel including the creation of a /32 prefix in a Forwarding Information Base (FIB) pointing to a tunnel adjacency to 123.1.1.2. The encapsulation string in the adjacency contains an outer IP header and other headers relevant to the tunneling mechanism and the VPN application e.g. the GRE header and an MPLS label. The destination address in the outer IP header contains the IP Address 123.1.1.2. The second IP lookup of the double switch in the forwarding path happens in the global FIB.

When the packet is received at PE Right 22, the destination IP address 123.1.1.2 indicates that the packet is destined to a local interface. The protocol type is identified e.g. GRE and the interface is determined to be a tunnel interface dedicated to L3 VPN transport. The VPN label (value 22) is looked up in a vpn tableand is found to be associated with the VRF "customerII". This implies that after the outer IP, tunnel and application headers have been stripped, the remaining payload will be reinserted at the top of the IP switch path.

Another example of how the invention might fit in as one component of an overall solution that might be of interest to a service provider will now be considered.

Say two service providers both sell a VPN service based on IP tunnels and wish to cooperate (for instance to service a larger geographic area). An InterAS VPN service may be provided (AS here stands for Autonomous System). Multihop eBGP VPNv4 updates can be exchanged using the feature that allows such updates to be propagated with unchanged next hop address.

Figure 7:
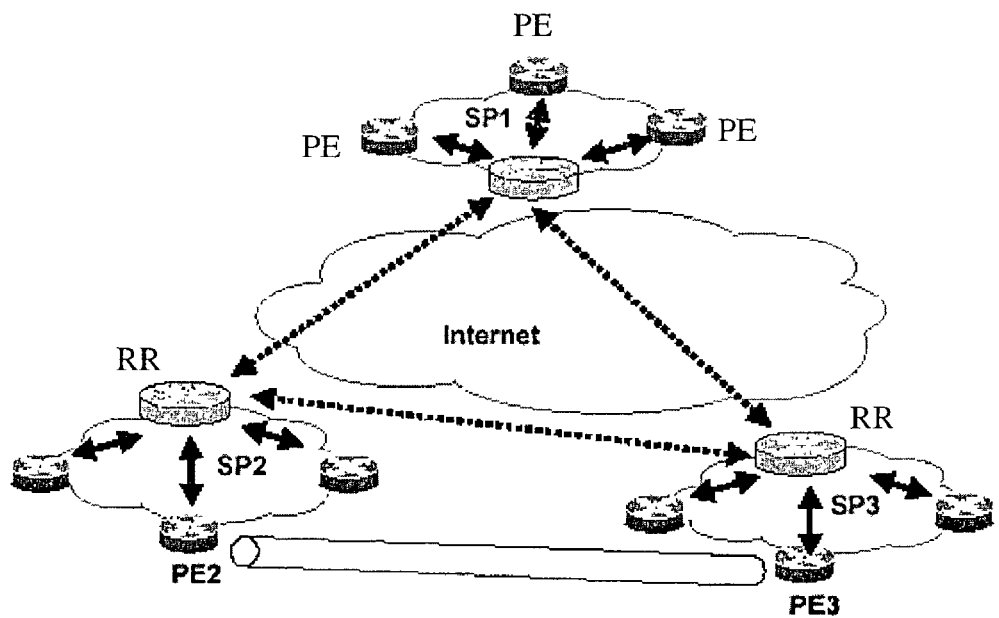
FIG. 7 shows an example of a network according to the invention implemented as an InterAS multipoint GRE tunnel VPN.

VPNv4 eBGP updates are exchanged between routers in the cooperating autonomous systems. Typically, these VPNv4 eBGP updates are exchanged between route-reflectors configured with a multihop eBGP session as shown in FIG. 7. Because the next hop can be propagated unchanged across the eBGP session as learnt from an iBGP session, the next hop will be that of the originating PE and thus the tunnel endpoint used for the advertised VPNv4 prefix will be that of the originating PE even from PE routers in the remote AS. Intermediate service providers do not need to cooperate beyond providing IP connectivity between the autonomous systems.

FIG. 7 shows three autonomous systems SP1, SP2 and SP3. Consider PE3 24 in Service Provider SP3. This PE would advertise any prefixes learnt from CE routers using an IP address in the transport network as the next hop address. This prefix would be propagated to the route reflector in SP3 as a VPNv4 update. The route reflector would reflect the VPNv4 updates to the rest of the PE routers in SP3 and it would also propagate the VPNv4 updates to the route reflectors in SP1 and SP2. The next hop would still be of an interface on PE3. The router reflectors at SP2 and SP1 would in turn propagate the update to all the PE routers in those autonomous systems. So PE2 would receive the VPNv4 prefix from PE3. At this point, the invention is put to use by choosing to interpret the next hop address as pertaining to the RiV. When the advertised prefix is resolved, it turns out to be via the tunnel interface with the endpoint address resolving to the next hop address in the global routing table. All traffic destined to the prefix would be tunneled directly to the next hop advertised by PE3.

Figure 8:
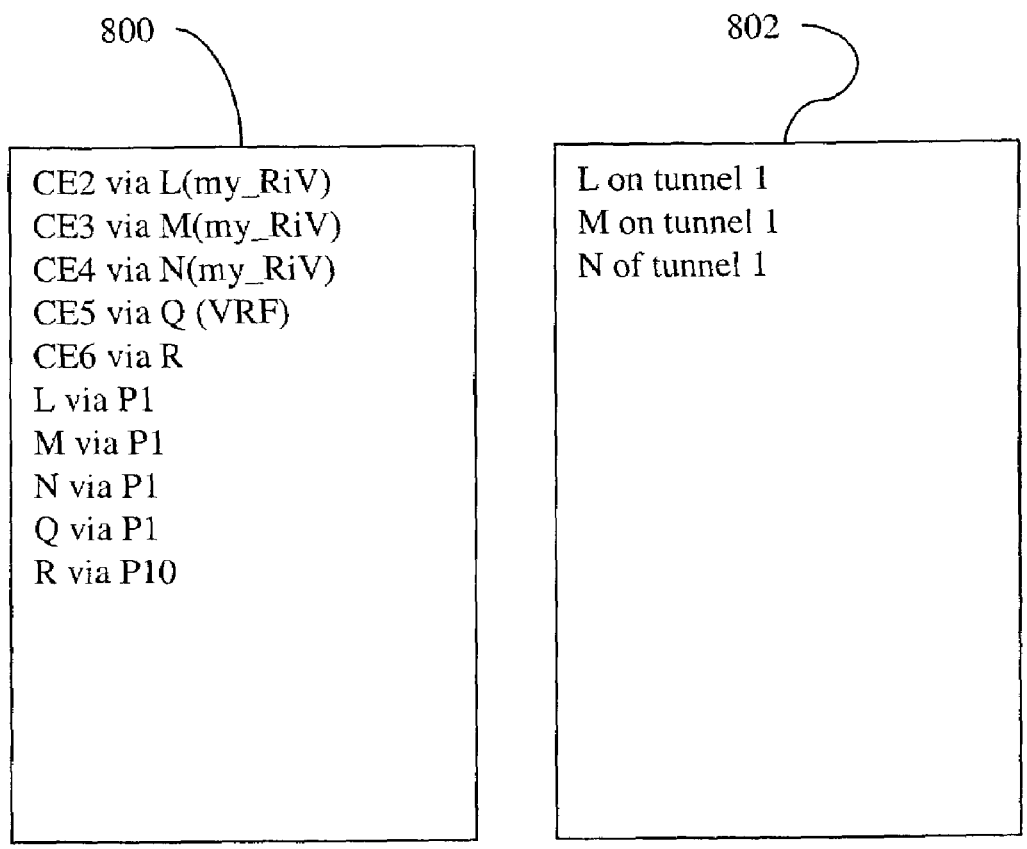
FIG. 8 is a schematic representation of a first and second address space as proposed in the invention.

FIG. 8 shows a schematic representation of the multiple address spaces used in the invention. A first address space 800 and a second address space 802 are shown. The first address space 800 represents the VRF of a given node (e.g. router PE1). This first address space 800 includes the destination address (e.g. CE2, CE3 etc.) and information as to how traffic for the destination is to be forwarded through the network (e.g. via L(my_RiV)).

The information relating to forwarding of traffic for the destination has an address L and an indicator (my_RiV) that tells the PE to look at address L in the second address space 802.

The second address space 802 has an address (e.g. L) and interface information (e.g. on tunnel 1). The address L is the tunneling address for traffic received at PE1 and destined for CE2 and indicates an address in the first address space.

In the first address space the routing information for address L is then resolved to an address in the transport layer (e.g. L via P1).

Considering traffic destined for CE2. On receipt of traffic destined for CE2, PE1 looks up in the VRF 800 for the forwarding information for CE2. From VRF 800 PE1 looks up CE2 and finds the information "via L(my_RiV)". In response, PE1 looks in the address space 802 labelled my_RiV, looks up L (as given in the VRF) and finds the information "on tunnel 1". PE1 then looks in the first address space 800 to find the next hop for traffic to destination L and finds that it is P1. PE1 then encapsulates the traffic for CE2 in a tunnel header that has as its destination address L (as given in (my_RiV)) and a label that indicates that it is tunneled on tunnel 1 and forwards this onto the next hop P1.

The encapsulated traffic is then forwarded to L without the payload of the traffic being examined.

The VRF may also include forwarding information for traffic that is not to be tunneled. For instance, as shown in FIG. 8, traffic for CE5 and CE6 does not require to be tunneled. In the case of CE5, traffic for CE5 is to be forwarded in a normal switched manner via address Q and Q can be reached via P1. This information is wholly stored within the first address space 800. PE1 therefore switches traffic for CE5 with a destination node Q and this traffic is first switched to P1. This is also the case for destination CE6 as shown in FIG. 8, where traffic for CE6 is via node R and is switched via node P1.

Thus, for traffic that does not require tunneling, the VRF may contain explicit information telling the PE1 to look in the VRF for the forwarding information (as is the case for CE5) or the default address space may be set to be VRF is specified) or there is no forwarding information and the PE looks in the VRF by default for the next hop.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. For instance, the invention has been described with particular reference to VPNs. However the invention is applicable to any internetworking system in which traffic is to be tunneled and in particular to any internetworking system in which the internetwork layer IP address of a tunnel endpoint in a second address space corresponds to a numerically equivalent link layer IP address in a first address space.

The invention claimed is:

1. A method for directing traffic across a network comprising:
   receiving traffic for a destination address in a network;
   looking up, in a first address space, information as to how traffic for the destination is to be forwarded, the information including a specified node N;
   looking up, in a second address spaces, a second address of the specified node N, the second address of the specified node N in the second address space being related to a first address in the first address space; and
   for traffic that is to be tunneled to the specified node N, then encapsulating the traffic using the first address specified in the first address space which is related to the second address in the second address space, wherein the second address is numerically identical to the first address.

2. A method according to claim 1, wherein the related address in the first address space is a link layer IP address corresponding to the second address in the second address space which second address is an internetwork layer IP address of a tunnel endpoint.

3. A method according to claim 1, wherein a multipoint tunnel network is defined in the second address space.

4. A method according to claim 1, wherein a routing protocol update is used to distribute routing information between nodes of the network.

5. A method according to claim 1, wherein the receipt of an advertised next hop in a routing protocol update triggers the creation of a tunnel endpoint with an IP address in the second address space corresponding to the IP address in the first address space.

6. A method according to claim 5 wherein the IP address in the second address space is an internetwork layer IP address and the IP address in the first address space is a link layer IP address.

7. A method according to claim 1, wherein a plurality of second address spaces are provided, corresponding to the definition of multiple tunnels.

8. A computer-readable storage medium embodying one or more sequences of instructions for directing traffic across a network, which instructions, when executed by one or more processors, cause the one or more processors to perform the steps of:
   receiving traffic for a destination address in a network;
   looking up, in a first address space, information as to how traffic for the destination is to be forwarded, the information including a specified node N;
   looking up, in a second address space, a second address of the specified node N, the second address of the specified node N in the second address space being related to a first address in the first address space; and
   for traffic that is to be tunneled to the specified node N, then encapsulating the traffic using the first address specified in the first address space which is related to the second address in the second address space, wherein the second address is numerically identical to the first address.

9. A computer-readable storage medium according to claim 8, wherein the related address in the first address space is a link layer IP address corresponding to the second address in the second address space which second address is an internetwork layer IP address of a tunnel endpoint.

10. A computer-readable storage medium according to claim 8, wherein a multipoint tunnel network is defined in the second address space.

11. A computer-readable storage medium according to claim 8, wherein a routing protocol update is used to distribute routing information between nodes of the network.

12. A computer-readable storage medium according to claim 8, wherein the receipt of are advertised next hop in a routing protocol update triggers the creation of a tunnel endpoint with an IP address in the second address space corresponding to the IP address in the first address space.

13. A computer-readable storage medium according to claim 12, wherein the IP address in the second address space is an internetwork layer IP address and the IP address in the first address space is a link layer IP address.

14. A computer-readable storage medium according to claim 8, wherein a plurality of second address spaces is provided, each of the second address spaces corresponding to one tunnel in the definition of multiple tunnels.

15. An apparatus for directing traffic across a network comprising:
   means for receiving traffic for a destination address in a network;
   means for looking up, in a first address spaces information as to how traffic for the destination is to be forwarded, the information including a specified node N;
   means for looking up, in a second address spaces, a second address of the specified node N, the second address of the specified node N in the second address space being related to a first address in the first address space; and
   for traffic that is to be tunneled to the specified node N, then means for encapsulating the traffic using the first address specified in the first address space which is related to the second address in the second address space, wherein the second address is numerically identical to the first address.

16. An apparatus according to claim 15, wherein the related address in the first address space is a link layer IP address corresponding to the second address in the second address space which second address is an internetwork layer IP address of a tunnel endpoint.

17. An apparatus according to claim 15, wherein a multipoint tunnel network is defined in the second address space.

18. An apparatus according to claim 15, wherein a routing protocol update is used to distribute routing information between nodes of the network.

19. An apparatus according to claim 15, wherein the receipt of an advertised next hop in a routing protocol update triggers a means for creating a tunnel endpoint with an IP address in the second address space corresponding to the IP address in the first address space.

20. An apparatus according to claim 19, wherein the IP address in the second address space is an internetwork layer IP address and the IP address in the first address space is a link layer IP address.

21. An apparatus according to claim 15, wherein a plurality of second address spaces are provided, corresponding to the definition of multiple tunnels.

22. An apparatus for directing traffic across a network, comprising:
   a processor;
   a network interface communicatively coupled to the processor and configured to communicate one or more packet flows among the processor and a network;
   a computer-readable storage medium accessible to the processor and embodying one or more sequences of instructions for directing traffic across a network, which instructions, when executed by one or more processors, cause the one or more processors to perform the steps of:
   receiving traffic for a destination address in a network;
   looking up, in a first address space, information as to how traffic for the destination is to be forwarded, the information including a specified node N;
   looking up, in a second address space, a second address of the specified node N, the second address of the specified node N in the second address space being related to a first address in the first address space; and
   for traffic that is to be tunneled to the specified node N, then encapsulating the traffic using the first address specified in the first address space which is related to the second address in the second address space, wherein the second address is numerically identical to the first address.

23. An apparatus according to claim 22, wherein the related address in the first address space is a link layer IP address corresponding to the second address in the second address space which second address is an internetwork layer IP address of a tunnel endpoint.

24. An apparatus according to claim 22, wherein a multipoint tunnel network is defined in the second address space.

25. An apparatus according to claim 22, wherein a routing protocol update is used to distribute routing information between nodes of the network.

26. An apparatus according to claim 22, wherein the receipt of an advertised next hop in a routing protocol update triggers the creation of a tunnel endpoint with an IP address in the second address space corresponding to the IP address in the first address space.

27. An apparatus according to claim 26, wherein the IP address in the second address space is an internetwork layer IP address and the IP address in the first address space is a link layer IP address.

28. An apparatus according to claim 22, wherein a plurality of second address spaces are provided, corresponding to the definition of multiple tunnels.

* * * * *

UNITED STATES PATENT AND TRADEMARK OFFICE
CERTIFICATE OF CORRECTION

PATENT NO. : 7,185,107 B1 Page 1 of 1
APPLICATION NO. : 10/270409
DATED : February 27, 2007
INVENTOR(S) : Christian Cassar It is certified that error appears in the above-identified patent and that said Letters Patent is hereby corrected as shown below:

COLUMN 15
Claim 1: Line 34, delete "spaces," and insert --space,--.

COLUMN 16
Claim 15: Line 51, delete "spaces," and insert --space,--.

Signed and Sealed this

First Day of May, 2007

JON W. DUDAS
*Director of the United States Patent and Trademark Office*